United States Patent [19]

O'Connor et al.

[11] Patent Number: 5,364,571
[45] Date of Patent: Nov. 15, 1994

[54] METHOD OF MAKING A COMPOSITE MATERIAL

[75] Inventors: Thomas J. O'Connor, Chelmsford, Mass.; Mark J. Pistorino, Pelham, N.H.; John J. Gaffney, N. Chelmsford; William T. Foulds, North Andover, both of Mass.

[73] Assignee: Avco Corporation, Providence, R.I.

[21] Appl. No.: 19,366

[22] Filed: Feb. 17, 1993

[51] Int. Cl.$^5$ .................. C04B 35/52; C04B 35/64; B32B 18/00
[52] U.S. Cl. .................. 264/29.5; 264/29.7; 273/193 R; 423/447.2; 423/447.8
[58] Field of Search .................. 264/29.1, 29.5, 29.7; 273/193 R; 423/447.2, 447.8

[56] References Cited

U.S. PATENT DOCUMENTS

| | | | |
|---|---|---|---|
| 3,462,289 | 8/1969 | Rohl et al. | 264/29.5 |
| 3,917,884 | 11/1975 | Jahn | 423/447.8 |
| 4,215,161 | 7/1980 | Seibold et al. | 264/29.5 |
| 4,409,048 | 10/1983 | Hatch et al. | 264/29.5 |

FOREIGN PATENT DOCUMENTS

WO92/01648  2/1992  WIPO.

*Primary Examiner*—Mathieu Vargot
*Attorney, Agent, or Firm*—Edmund J. Walsh

[57] ABSTRACT

Net shape composite articles are made by a molding process. The molded preform is densified in a process where the rate of temperature increase is controlled to prevent distortion. The densified composite objects are impregnated with a secondary material to provide desirable properties such as strength, stiffness, or oxidation resistance. Diverse parts such as golf clubs and engine parts can be made by the process.

13 Claims, No Drawings

METHOD OF MAKING A COMPOSITE MATERIAL

This invention relates generally to composite materials having high strength or resistance to high temperatures and more particularly to such composite materials made by densifying a fibrous preform.

It has been known for many years that commercially desirable materials can be made by forming a composite of different types of materials. One type of composite is termed a carbon/carbon composite. Carbon/carbon composites are made by first forming a preform of carbon fibers. The preform is then "densified." The process of densification involves filling the space between the fibers with carbon.

Densified carbon/carbon composites have a relatively high tensile strength. They also will not crack due to thermal stress even if they are exposed to environments where the temperature increases by over a thousand degrees in a short time. They are also of very low weight. Because of these advantages, carbon/carbon composites are used in aerospace applications for such things as exhaust nozzles for rockets.

One drawback of carbon/carbon composites is that they are oxidized in a reducing atmosphere at temperatures above 650° F. If oxidation is a problem, the carbon/carbon composite may be coated with a protective layer of a material which will not be oxidized. For example, silicon carbide is used as a coating. In other instances, "inhibitors" are mixed into the preform. The inhibitors combine with oxygen radicals to prevent the carbon from being oxidized.

A second drawback of carbon/carbon composites is that they are, in comparison to metals, relatively soft. For this reason, they can not be used in applications where they might be damaged by impact.

Another drawback of carbon/carbon composites is that the step of depositing the carbon between the fibers also causes a buildup of carbon outside the fibers. The finished composite, thus has a different shape than the fibrous preform.

Carbon/carbon composites are generally made by impregnating a fibrous preform. Several methods of densifying the fibrous preform are known. For example, chemical vapor infiltration has been used. Another widely used method of densification involves infiltrating the fibrous preform with a carbonaceous resin. The structure is then heated to a very high temperature to carbonize the resin. To make the preform fully dense, i.e. fill in excess of 90% of the space between the fibers with carbon, several cycles of impregnating the preform with resin and heating it are performed.

To improve the impregnation of the resin into the carbon matrix, the part is subjected to a process called microcracking between cycles. In this process, the carbon matrix is stressed by pressure or temperature to cause small cracks in the matrix into which the resin may flow. The finished part is then machined to the desired shape.

Preforms for carbon/carbon composites have also been made by mixing carbon fibers with a resin and then molding the resin into a desirable shape. The preform is then heated to carbonize the resin. The part can be further densified by any of the known densification processes.

We have also discovered that traditional densification processing generates gas within the preform which distorts the shape of the finished composite. In traditional processing, the distortion is not a problem because the densified preform is usually machined to its final shape. Some densification processes produce densified composites which are close to the final shape. For example, the process described in U.S. Pat. No. 4,472,454 to Houdayer et al. results in densified preforms which need only to be machined at the ends. However, the process of this patent requires that a preform be woven into the desired shape before densification. It would be desirable to make a "net shape" composite without having to weave a preform in the required shape.

SUMMARY OF THE INVENTION

With the foregoing background in mind, it is an object of this invention to provide a light weight composite material which can withstand an impact without denting or deforming.

It is also an object to provide a method of making near net shape composites from a fibrous preform.

The foregoing and other objects are achieved in a composite made by forming a molded preform by compressing fibers coated with a carbonaceous resin into a net shape preform and then slowly increasing the temperature of the composite to carbonize the resin. Optionally, the carbonized preform is impregnated with a strengthening material, a protective coating, or other material which imparts desirable properties.

According to one embodiment of the invention, the molded preform is a net shape preform. In an alternative embodiment, the strengthening material is an epoxy resin.

DESCRIPTION OF THE PREFERRED EMBODIMENTS

Materials according to a first embodiment of the invention are made by molding fibrous material into a net shaped preform and then densifying the preform according to a controlled temperature cycle which does not distort the preform.

Many types of fibrous materials may be used to form the preform. One example of a suitable material is carbon fibers woven into a suitable shape, such as disclosed in U.S. Pat. No. 3,904,464 to King. Fibers of silicon carbide, boron, KEVLAR, or other material providing adequate strength over the intended operating range of temperatures might also be used. It should also be understood that the word "fiber" is not limited to a monofilament. Multifilaments, yarns, or tows could equally well be used to make the preform.

The preform can also be shaped from sheets of woven fibers or from tapes of numerous fibers held together by a binder.

Where the fibrous preform is made from "dry" fibers it is necessary to impregnate the preform with a resin which will densify the preform upon further processing. To densify with carbon, a carbonaceous resin is used. Preferably, a resin from the class known as "high charring" resin is used. Phenolic or epoxy resins are examples of suitable resins. If the preform is to be densified with silicon carbide or other material, the preform is impregnated with a material which will pyrolize or otherwise transform into silicon carbide o, the desired material.

If the fibrous preform is made with material which is already coated with a resin or other suitable impregnation material, commonly called a "prepreg," the step of impregnating the preform can be omitted.

It is also possible, and in instances is preferable, to form the preform by molding fibers into the desired shape. Any known molding technique could be used. Examples of suitable molding techniques are compression molding and injection molding. Preferably, fibers mixed with a binder are compressed into the desired shape. Use of mold release and other practices commonly used in molding operations are preferred.

Any sort of fiber might be used, including those described above. Also, any sort of binder could be used, though the materials described above for use as impregnants are preferably used. More preferably, though, lengths of carbon fibers mixed with a resin are molded into a preform. Preferably fibers up to two inches long having a density between 1.45 and 2.10 g/cc are used. Fiber length is, however, not critical and lengths around one quarter inch are preferred if injection molding techniques are employed. Here, AVCARB TM, spun yarn, carbon fibers available from Textron Specialty Materials of Lowell, Massachusetts, USA were used. However, many other materials would be suitable.

The carbon fibers were "prepregged" with a high charring resin which serves as both an impregnant and a binder. Preferably a phenolic resin is used. Here, a resin sold by Borden of Middlesex, N.J., USA under the designation SC1008 was used.

"Prepregging" is a process where the fibers are coated with resin, such as by passing them through a resin bath. For some resins, it may be desirable to heat the coated fibers to partially cure the resin. The fibers are coated with resin to result in a prepreg preferably from 30% to 70% fibers, more preferably between 45% and 55% fibers, and most preferably 52.5% fibers. The resultant mixture is then chopped to the desired length and can then be introduced into a mold. As will be hereafter described, the finished composite will have nearly the same shape as the molded preform. Accordingly, the mold is shaped in the shape of the finished article. In this way, with a slight amount of sanding or other finishing, the part will have the desired shape.

While the material is in the mold, it may be heated to accelerate curing of the resin. The material may also be placed under pressure or vacuum to minimize the amount of voids in the material.

After the binder cures, the preform is unmolded and processed to pyrolize the impregnants in the binder and form a porous carbon matrix. To preserve the shape of the preform, it is necessary that the temperature and pressure of the preform be controlled so that no distortion of the preform occurs. It has been discovered that too rapid a temperature rise causes evolution of gasses in the preform which in turn displaces fibers and distorts the preform. On the other hand, too slow a temperature rise is undesirable because it increases the time required to make a part. Preferably, the temperature of the preform is increased slowly at temperature ranges where gas is likely to evolve and more quickly at other temperature ranges.

With the above described phenolic resin, rapid temperature increases of between 10° to 250° F. per hour are possible at temperatures up to around 347° F. (175° C.), in a range around 400° to 550° F. (288° C.) and again roughly between 700° and 1202° F. At other temperatures, the rate of increase must be slower, in the range of 1° to 10° F. per hour. The following table gives a list of suitable rates of temperature increase for various processing temperatures and temperature range increments.

| Temperature Range (Degrees F.) | Rate of Temperature Increase (Degrees F./Hour) |
| --- | --- |
| below 347° | 180° |
| 347° to 437° | 8° |
| 437° to 527° | 36° |
| 527° to 617° | 3.6° |
| 617° to 716° | 9° |
| 716° to 1202° | 18° |

After the temperature reached 1202° F., the temperature was held constant for four hours, which was sufficient time to carbonize the resin.

Composite parts, such as the carbon/carbon composite material made by the molding process of Example I have the properties of conventionally made carbon/carbon composites. It may be desirable to impart other properties to the composite such as extra strength, less ductility, or oxidation resistance. These properties may optionally be imparted to the composite by impregnating the composite with a secondary material.

The secondary material may be any material which imparts the desired properties. A resin, such as phenolic or epoxy resin, could be used as the secondary material if less ductility and greater strength are required at low temperatures. A mixture of resins might be used to obtain desired properties, such as good strength when cured and low viscosity before cure. Similar properties can be imparted at higher temperatures by using a metal as the secondary material. Alternatively, the secondary material could be a microfine powder. If oxidation resistance is desired, the secondary material could be a resin containing heavy metals which bind with free oxygen to prevent oxidation. Other material, such as ceramics, could also be used.

Before impregnating with a secondary material, it will sometimes be desirable to perform an operation called "microcracking the matrix." In this operation, small cracks are made between the fibers and the carbon matrix. These cracks do not appreciably weaken the strength of the composite because the fibers are still embedded in the matrix. However, the microcracks provide channels for the secondary material to fully impregnate the matrix. The microcracks also provide stress relief so that the final composite will be less likely to shatter.

Microcracking could be achieved by imposing forces on the composite through any means such as mechanical force applied in a press or thermal stress created by heating the composite to very high temperatures. Table II gives an example of a suitable processing cycle to microcrack the matrix.

| Temperature Range (Degrees F.) | Rate of Temperature Increase (Degrees F./Hour) |
| --- | --- |
| Below 400° C. | 75° C./hour |
| 400° C. to 1200° C. | 40° C./hour |
| 1200° C. to 1775° C. | 75° C./hour |

After the temperature of 1775° C. has been reached, the temperature was held constant for ten hours, which was sufficient time to microcrack the carbonized resin matrix.

Several techniques for impregnating the composite with a secondary material could be used. For example, chemical vapor infiltration could be used to impregnate the composite with a ceramic material. Vacuum casting techniques can be used to impregnate the composite with a metal. To impregnate with a resin, the part could be placed in a vacuum chamber or a pressure chamber while covered by the resin or immersed in the resin. After suitable infiltration, the composite can be removed from the resin and heated to allow the resin to cure. Where the preform is made by molding, the part can be replaced in the mold for impregnation to reduce the amount of secondary material needed to cover the part.

If microcracking is not performed, elevated pressures may be needed to impregnate with the secondary material. The following examples indicate the range of objects that can be made according to the invention.

EXAMPLE I

A number 1 "wood" golf club head was made as follows. AVCARB ™ carbon fibers were mixed with SC1008 phenolic resin in a ratio of 1.11 to 1.00 and chopped to one half inch length. The mixture was pressed into a mold, preheated to 165° F., in the shape of the golf club head. Molding was performed at a pressure of 3,000 psi at a temperature of 180° F. for one hour and then raised to 325° F. over a period of two hours. The mold was held at 3000 psi and 325° F. for an additional one hour period. Then, the preform was unmolded and carbonized in an electrically heated carbonization furnace according to the temperature profile of Table I while maintained in an inert gas nitrogen atmosphere.

Next the part was placed in a vacuum chamber at 30 inches mercury vacuum for a period of one half hour while immersed in Fiberite 949 solution, a toughened epoxy resin available from ICI Fiberite Winona, Minn. After one half hour, the part was removed from the vacuum and pressurized to 2100 psi for a period of 2 hours. The excess resin was wiped off the surface of the part and the part was cured in an oven at 120° F. for two hours and then for four hours at 150°–175° C.

The resulting golf club head was mounted on a shaft and tested by hitting golf balls. A mechanical testing device was used to repeatedly hit golf balls at 115 mph. The club head did not dent, crack or break even after 1,000 hits.

EXAMPLE II

A golf club head as in Example I was made except that a mixture of an epoxy resin from Shell Chemical Company, Houston, Texas, USA and an anhydride hardener available from Anhydride and Chemicals, Inc., Newark, N.J., USA was used in place of the Fiberite resin. The resin mixture was made with five parts Epon 828 (Shell), 5 parts Epon 871 (Shell) and 8 parts of ACDN-1 hardener (Anhydrides).

EXAMPLE III

Number 3 "wood" golf club heads were made as follows. AVCARB ™ carbon fibers were combined with SC1008 phenolic resin in a ratio of 1.11 to 1.00 and chopped to one half inch length. The mixture was pressed into a mold, preheated to 375° F., in the shape of the golf club heads. Molding was performed at a pressure of 3,000 psi at a temperature of 375° F. for one-half hour. Then the preform was unmolded and carbonized in an electrically heated carbonization furnace according to the temperature profile of Table I while maintained in an inert gas nitrogen atmosphere. Then the part was microcracked by subjecting it to the temperature profile of Table II.

Next the part was placed in a vacuum chamber at 30 inches mercury vacuum for a period of eight hours and while immersed in Fiberite 949 solution, a toughened epoxy resin available from ICI Fiberite Winona, Minn. After eight hours, the part was removed from the vacuum, the excess resin was wiped off the surface of the part and the part was cured in an oven at 300° F. for one hour.

The resulting golf club head was mounted on a shaft and tested by hitting golf balls. The club head did not dent or break even after repeated hits.

For aesthetic reasons, the club head could be finished by spraying with an epoxy or urethane and then buffing the club head.

EXAMPLE IV

A baseball bat could be made according to the invention. The same procedure as in Example I could be used except the mold would be shaped as a baseball bat.

EXAMPLE V

The materials and conditions of Example I were used except the mold was preheated to 325° F. After filling the mold with fiber resin mixture, the mold was held at 3,000 psi for only 20 minutes. For molding at these higher temperatures, a high temperature mold release is used. Heating the mold reduces total processing time.

EXAMPLE VI

The materials of Example II can be repeated except the resin would be a mixture of 50 parts by weight DER736 from Dow Chemical, 50 parts by weight DER332 from Dow and 65 parts by weight ACDN-1. This blend of resins has a lower viscosity and provides better impregnation.

Having described various embodiments of the invention, it will be apparent that one of skill in the art could construct various alternative embodiments without departing from the invention. For example, any number of materials could be used for the secondary material. Metals might be deposited from the vapor phase or inserted through injection molding. Resins containing heavy metals could be used to make oxidation inhibited composites. Accordingly, the invention should be limited only by the spirit and scope of the appended claims.

What is claimed is:

1. A method of making golf club head comprising the steps of:
   a. molding a mixture comprising carbon fibers and a carbon-containing resin into the shape of the golf club head;
   b. curing the molded carbon-containing resin;
   c. converting the molded carbon-containing resin to a porous carbonaceous matrix by gradually heating said molded resin up to its pyrolysis temperature over a broad temperature range including first predetermined temperature range increments at which gas is evolved therefrom more rapidly than at second predetermined temperature range increments within said broad range;
   d. controlling the heating rate during step (c) so that the temperature is gradually increased at a reduced rate of up to about 10° F. per hour over said first predetermined temperature range increments, during periods of more rapid gas evolution, and at a higher rate of at least about 18° F. per hour over said second predetermined temperature range increments, and e. impregnating the porous carbonaceous matrix with a secondary material imparting properties different than the carbonaceous matrix.

2. The method of making a golf club of claim 1 wherein the step of converting the resin comprises heating the resin to pyrolysis temperatures in excess of 1,000° F.

3. The method of making a golf club of claim 1 wherein the step of heating the resin comprises controlling the temperature of the resin at rates between 1° F. and 10° F. per hour over said first predetermined temperature range increments.

4. The method of making a golf club head of claim 1 wherein the step of heating comprises controlling the temperature of the resin at rates between 25° and 250° F. per hour over said second predetermined temperature range increments.

5. The method of making a golf club head of claim 1 further comprising a step of microcracking the matrix.

6. The method of making a golf club head of claim 1 wherein the carbon fibers have an average length below 2 inches.

7. The method of making a golf club head of claim 1 wherein the carbon containing resin comprises a phenolic resin.

8. The method of making a golf club head of claim 1 wherein the carbon containing resin comprises an epoxy resin.

9. A method of making a composite molded article comprising the step of:
   a. molding a resinous material containing fibers into a predetermined shape;
   b. curing the resin;
   c. pyrolizing the resinous material to form a rigid porous matrix around the fibers by gradually heating said molded resin up to its pyrolysis temperature over a broad temperature range including first predetermined temperature range increments at which gas is evolved therefrom more rapidly than at second predetermined temperature range increments within said broad range;
   d. controlling the heating rate during step (c) so that the temperature is gradually increased at a reduced rate of up to about 10° F. per hour over said first predetermined temperature range increments, during periods of more rapid gas evolution, and at a higher rate of at least about 18° F. per hour over said second predetermined temperature range increments;
   e. impregnating the pores of the matrix with a second type of resin; and
   f. curing the second type of resin to strengthen the composite material.

10. The method of claim 9 wherein the step of molding comprises molding in the shape of a baseball bat.

11. The method of claim 9 wherein the step of molding comprises heating the resinous material in a mold.

12. The method of claim 11 wherein the step of molding comprises heating the mold before filling it with a resinous material containing fibers.

13. The method of claim 9 additionally comprising the step of mixing two types of epoxy resins to form the second type of resin used in step (d).

* * * * *